United States Patent
Vinchure et al.

(10) Patent No.: US 12,334,727 B1
(45) Date of Patent: Jun. 17, 2025

(54) MULTI-AGENT MACHINE LEARNING FRAMEWORK FOR BIDIRECTIONAL BATTERY ENERGY STORAGE SYSTEMS

(71) Applicant: ElectricFish Energy Inc., San Carlos, CA (US)

(72) Inventors: Abhishek Hemant Vinchure, San Carlos, CA (US); Soudip Roy Chowdhury, San Carlos, CA (US); Anurag Kamal, San Carlos, CA (US); Nelio Batista, San Carlos, CA (US)

(73) Assignee: ElectricFish Energy Inc., San Carlos, CA (US)

( * ) Notice: Subject to any disclaimer, the term of this patent is extended or adjusted under 35 U.S.C. 154(b) by 0 days.

(21) Appl. No.: 19/060,799

(22) Filed: Feb. 24, 2025

(51) Int. Cl.
*H02J 13/00* (2006.01)
*G06Q 30/0201* (2023.01)
*G06Q 50/06* (2024.01)
*H02J 7/00* (2006.01)

(52) U.S. Cl.
CPC .... *H02J 13/00002* (2020.01); *G06Q 30/0206* (2013.01); *G06Q 50/06* (2013.01); *H02J 7/0047* (2013.01); *H02J 2203/10* (2020.01)

(58) Field of Classification Search
CPC ............ H02J 13/00002; H02J 7/0047; H02J 2203/10; G06Q 30/0206; G06Q 50/06
See application file for complete search history.

(56) References Cited

U.S. PATENT DOCUMENTS

| | | | |
|---|---|---|---|
| 11,270,243 B1* | 3/2022 | Roy | B60L 53/67 |
| 2010/0274407 A1* | 10/2010 | Creed | G05B 15/02 |
| | | | 700/295 |
| 2011/0202418 A1* | 8/2011 | Kempton | B60L 53/63 |
| | | | 705/26.1 |
| 2012/0059527 A1* | 3/2012 | Beaston | H02J 13/00034 |
| | | | 713/320 |
| 2017/0005515 A1* | 1/2017 | Sanders | H02J 3/388 |
| 2021/0003974 A1* | 1/2021 | Yang | G05B 13/027 |
| 2022/0067850 A1* | 3/2022 | Bhasme | H02J 7/00716 |
| 2023/0024900 A1* | 1/2023 | Ayoola | B60L 55/00 |
| 2024/0331064 A1* | 10/2024 | Walkingshaw | G05B 15/02 |

FOREIGN PATENT DOCUMENTS

| | | |
|---|---|---|
| CN | 110929948 A | 3/2020 |
| CN | 111884213 A | 11/2020 |
| CN | 112186799 A | 1/2021 |
| CN | 115333143 A | 11/2022 |

* cited by examiner

*Primary Examiner* — Ziaul Karim
(74) *Attorney, Agent, or Firm* — Boon Intellectual Property Law, PLLC; Brian S. Boon

(57) ABSTRACT

A system and method for management and control of battery energy storage systems in complex and dynamic multi-factor environments using a degradation-aware multi-agent machine learning framework. The management and control methodology involves coordination of a plurality of software agents to simultaneously optimize multiple factors in battery energy storage system environments such as energy arbitrage, battery health, charging schedules, and backup power.

16 Claims, 9 Drawing Sheets

MULTI-AGENT MACHINE LEARNING FRAMEWORK FOR BIDIRECTIONAL BATTERY ENERGY STORAGE SYSTEMS

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of battery energy storage systems (BESS), and more particularly to control systems for multi-factor optimization of BESS charging and discharging regimes.

Discussion of the State of the Art

Battery energy storage systems (BESSs) are becoming increasingly important as a means of storing and utilizing energy. Such systems have been used in the small scale for decades, such as rechargeable batteries for electronic devices. However, due to recent improvements in battery technology and other factors, BESSs are now being used for high-capacity and high-output systems such as solar power systems, residential power systems, and electric vehicles, which are often bi-directionally connected to the electrical power grid.

A known problem with BESSs is degradation of battery capacity and power over time due to chemical and physical changes that occur within the batteries over time. This degradation is made worse under non-ideal charging and discharging conditions such as fast charging, low temperature charging, high temperature charging and operation, over-charging, and over-discharging. In high-capacity and high-output systems where the battery components are large and expensive, the cost associated with battery degradation can be high. Other difficulties in management of BESSs include such things as grid capacity problems (i.e., insufficient grid capacity to meet the new, high-power requirements of charging large numbers of EVs on top of more traditional power requirements), electricity rate differences (regional differences, tiered use differences, and more recently dynamic pricing changes), scheduling problems (e.g., in the case of many EVs trying to access a limited number of EV charging stations), and many other factors.

Existing approaches to energy management in BESSs microgrids and EV charging scenarios rely either on rule-based/heuristic controls or on single-agent machine learning. Rule-based/heuristic controls are by their nature attempts to simplify complexity and are inadequate for adapting to complex, dynamic changes and uncertain events. Single-agent machine learning methods optimize a single objective (e.g., energy arbitrage or EV scheduling) out of many, but do not address the conflicting and changing objectives and interdependencies among complex, multi-factor systems.

What is needed is a management and control system for battery energy storage systems (BESSs) that optimizes for multiple factors simultaneously in a complex and dynamic multi-factor environment.

SUMMARY OF THE INVENTION

Accordingly, the inventor has conceived and reduced to practice, a system and method for management and control of battery energy storage systems in complex and dynamic multi-factor environments using a degradation-aware multi-agent machine learning framework. The management and control methodology involves coordination of a plurality of software agents to simultaneously optimize multiple factors in battery energy storage system environments such as energy arbitrage, battery health, charging schedules, and backup power.

According to a preferred embodiment, a system for management and control of battery energy storage systems is disclosed, comprising: a computer system comprising a memory and a processor; a central controller comprising a first plurality of programming instructions stored in the memory which, when operating on the processor, causes the computer system to: receive or retrieve data of a plurality of the following types: market-related data, EV charging data, system telemetry data, and grid status data; send the received or retrieved data to two or more of a plurality of other agents; receive one or more directives from a coordinator agent; and implement the directives by operating one or more hardware components; the coordinator agent comprising: a coordinator agent learning environment comprising coordinator environment data; a second plurality of programming instructions stored in the memory which, when operating on the processor, causes the computer system to: receive a prediction, or a recommendation, or both, from the two or more of the plurality of other agents; process the prediction, or recommendation, or both, by applying a first machine learning algorithm to the prediction, or recommendation, or both, in conjunction with the coordinator agent learning environment to generate the one or more directives for operation of hardware components; and forward the one or more directives to the central coordinator for implementation; the two or more of the plurality of other agents drawn from the following list of other agents: an energy arbitrage agent comprising: an energy arbitrage agent learning environment comprising energy arbitrage environment data; a third plurality of programming instructions stored in the memory which, when operating on the processor, causes the computer system to: receive the market-related data from the central coordinator; process the market-related data by applying a second machine learning algorithm to the energy arbitrage agent learning environment and the market-related data to obtain an energy arbitrage prediction or recommendation; and forward the energy arbitrage prediction or recommendation to the coordinator agent; an EV scheduling agent comprising: an EV scheduling agent learning environment comprising EV charging environment data; a fourth plurality of programming instructions stored in the memory which, when operating on the processor, causes the computer system to: receive the EV charging data from the central coordinator; process the EV charging data by applying a third machine learning algorithm to the EV charging agent learning environment and the EV charging data to obtain an EV charging prediction or recommendation; and forward the EV charging prediction or recommendation to the coordinator agent; a battery management system agent comprising: a battery management system agent learning environment comprising battery management system data; a fifth plurality of programming instructions stored in the memory which, when operating on the processor, causes the computer system to: receive the system telemetry data from the central coordinator; process the system telemetry data by applying a fourth machine learning algorithm to the battery management system agent learning environment and the system telemetry data to obtain a battery management prediction or recommendation; and forward the battery management prediction or recommendation to the coordinator agent; and a battery management system agent comprising: a backup power agent learning environment comprising backup power environment data; a sixth plurality of programming instructions stored in the memory which, when operating on the processor, causes the computer system to: receive the grid status data from the central coordinator; process the grid status data by applying a fifth machine learning algorithm to the backup power agent learning environment and the grid status data to obtain a backup power prediction or recommendation; and forward the backup power prediction or recommendation to the coordinator agent.

According to another preferred embodiment, a method for management and control of battery energy storage systems is disclosed, comprising the steps of: a computer system comprising a memory and a processor; using a central controller operating on a computer system comprising a memory and a processor to perform the steps of: receiving or retrieving data of a plurality of the following types: market-related data, EV charging data, system telemetry data, and grid status data; sending the received or retrieved data to two or more of a plurality of other agents; receiving one or more directives from a coordinator agent operating on the computer system; and implementing the directives by operating one or more hardware components; using the coordinator agent comprising a coordinator agent learning environment comprising coordinator environment data to perform the steps of; receiving a prediction, or a recommendation, or both, from the two or more of the plurality of other agents; processing the prediction, or recommendation, or both, by applying a first machine learning algorithm to the prediction, or recommendation, or both, in conjunction with the coordinator agent learning environment to generate the one or more directives for operation of hardware components; and forwarding the one or more directives to the central coordinator for implementation; selecting the two or more of the plurality of other agents drawn from the following list of other agents to perform the following further steps: using an energy arbitrage agent operating on the computer system and comprising an energy arbitrage agent learning environment comprising energy arbitrage environment data to perform the steps of: receiving the market-related data from the central coordinator; processing the market-related data by applying a second machine learning algorithm to the energy arbitrage agent learning environment and the market-related data to obtain an energy arbitrage prediction or recommendation; and forwarding the energy arbitrage prediction or recommendation to the coordinator agent; using an EV scheduling agent operating on the computing device and comprising an EV scheduling agent learning environment comprising EV charging environment data to perform the steps of: receiving the EV charging data from the central coordinator; processing the EV charging data by applying a third machine learning algorithm to the EV charging agent learning environment and the EV charging data to obtain an EV charging prediction or recommendation; and forwarding the EV charging prediction or recommendation to the coordinator agent; using a battery management system agent operating on the computer system and comprising a battery management system agent learning environment comprising battery management system data to perform the steps of: receiving the system telemetry data from the central coordinator; processing the system telemetry data by applying a fourth machine learning algorithm to the battery management system agent learning environment and the system telemetry data to obtain a battery management prediction or recommendation; and forwarding the battery management prediction or recommendation to the coordinator agent; and using a battery management system agent operating on the computer system and comprising a backup power agent learning environment comprising backup power environment data to perform the steps of: receiving the grid status data from the central coordinator; processing the grid status data by applying a fifth machine learning algorithm to the backup power agent learning environment and the grid status data to obtain a backup power prediction or recommendation; and forwarding the backup power prediction or recommendation to the coordinator agent.

According to an aspect of an embodiment, a plurality of the machine learning algorithms are reinforcement learning type algorithms in which in which rewards are assigned to successful outcomes and/or penalties are assigned to unsuccessful outcomes.

According to an aspect of an embodiment, the market-related data comprises current electrical power rates; the EV charging data comprises a demand for EV charging; the system telemetry data comprises a battery charge status; and the grid status data comprises an indication as to whether the grid is online.

According to an aspect of an embodiment, the coordinator environment data comprises one or more of a global system optimization objective, an operational constraint, a user satisfaction goal, a battery longevity goal, and a system resilience goal.

According to an aspect of an embodiment, the energy arbitrage environment data comprises one or more of a market price, a market pricing trend, a charge, discharge, or power demand, a grid service participation rate, and a condition of a batteries being charged or discharged.

According to an aspect of an embodiment, the EV charging environment data comprises one or more of a power allocation schedule for EVs, a charging priority, an EV charging demand, a queue length, a user requirement, and an EV battery history or condition.

According to an aspect of an embodiment, the battery management system environment data comprises one or more of a power setpoint, a temperature setpoint, a temperature, a temperature history, states of charge, a charge limit, an operational change, a maintenance history, a charge rate limitation, a predicted capacity loss, and a degradation risk metric.

According to an aspect of an embodiment, the backup power environment data comprises one or more of a grid status, a grid power transition, an available backup power indicator, a backup activation indicator, a power allocation, a mode transition priority, and a critical load threshold.

BRIEF DESCRIPTION OF THE DRAWING FIGURES

DETAILED DESCRIPTION OF THE INVENTION

Figure 1:
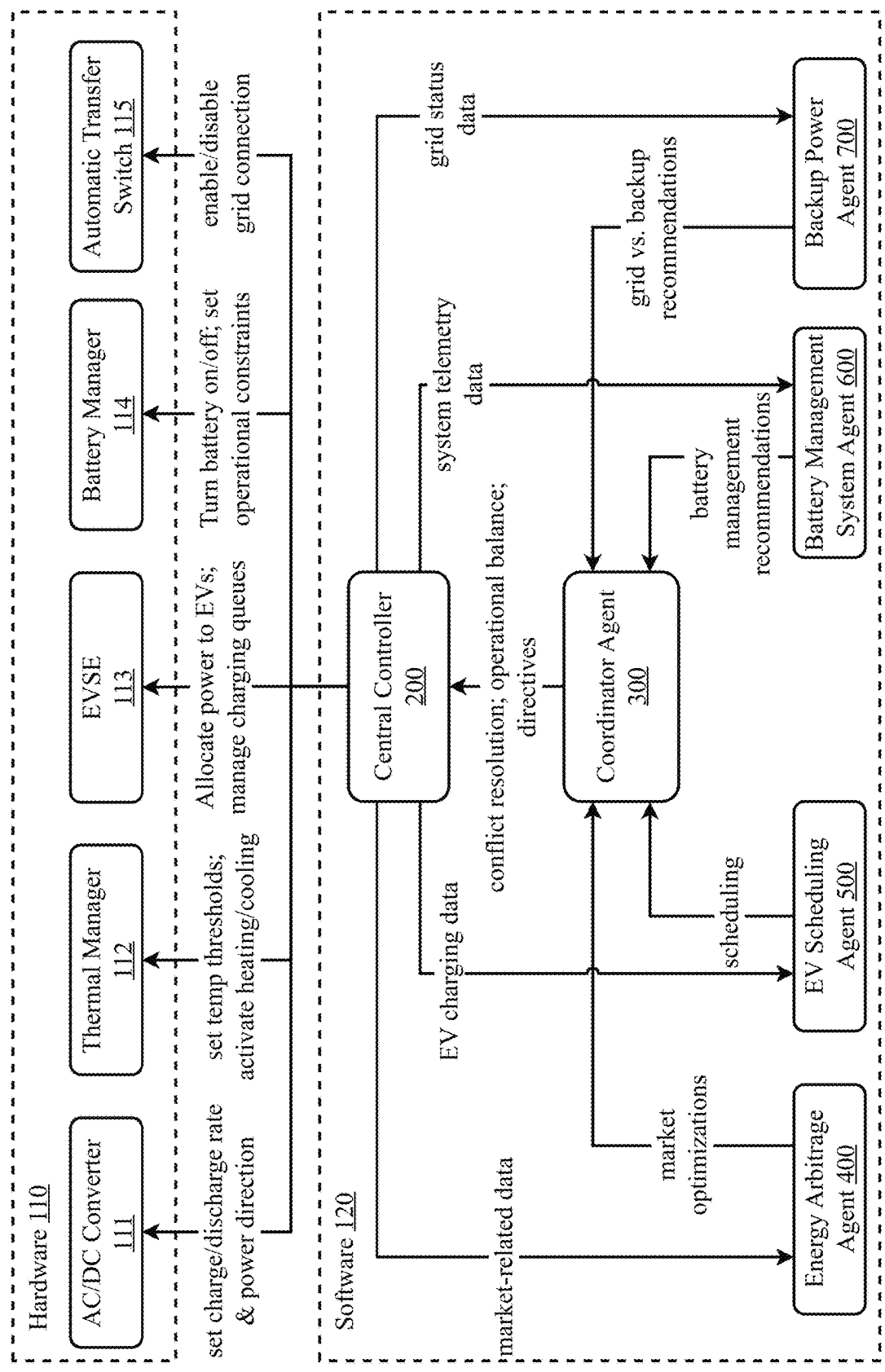
FIG. 1 is a block diagram illustrating an exemplary system architecture for a system for management and control of battery energy storage systems in complex and dynamic multi-factor environments using a degradation-aware multi-agent machine learning framework.

The inventor has conceived, and reduced to practice, a system and method for management and control of battery energy storage systems in complex and dynamic multi-factor environments using a degradation-aware multi-agent machine learning framework. The management and control methodology involves coordination of a plurality of software agents to simultaneously optimize multiple factors in battery energy storage system environments such as energy arbitrage, battery health, charging schedules, and backup power.

The systems and methods described herein relate generally to the field of battery energy storage systems (BESS), electric vehicle (EV) charging infrastructures, and microgrids. More specifically, disclosed herein is a multi-agent machine learning (MAML) framework for managing bidirectional battery energy storage systems for homes, solar panel installations, EV charging stations, and other similar installations. While not all embodiments are limited to electrical-grid-connected applications, a primary use case is for battery energy storage systems that are connected to the electrical grid, and most of the examples described herein are grid-connected. In an embodiment, the system and method are configured for use in one or more electrical vehicle charging stations.

Battery degradation has been well recognized as a major cost factor in BESS and EV infrastructure due to frequent charge/discharge cycles. Traditional energy optimization systems do not incorporate detailed battery degradation models in real-time decision-making, resulting in suboptimal operational strategies that compromise long-term battery health. Furthermore, backup power management is often handled by siloed controllers, which can be slow to react or may not prioritize battery health and user satisfaction. The systems and methods described herein seek to solve these problems by introducing an integrated, multi-agent system that dynamically optimizes for multiple factors associated with BESS systems, such as energy arbitrage factors, EV charging factors, battery health and management factors, and backup power operations in a grid-connected environment.

Where existing BESS systems perform optimization, they address each environment or subsystem in isolation, leading to potential conflicts in priorities and directives, missed opportunities for complementary operations to increase efficiency, operational decisions detrimental to certain parts of the overall system, and/or to sub-optimal performance of the entire system. The systems and methods disclosed herein integrate the optimization of each environment and/or subsystem to provide a cohesive control solution capable of optimizing management and control of battery energy storage systems in complex and dynamic multi-factor environments. As an example, the systems and methods disclosed herein facilitate optimizing energy arbitrage in real-time and day-ahead energy markets, coordinating EV charging to meet user-defined service level agreements (SLAs), preserving battery health through continual monitoring of degradation parameters and real-time battery management system (BMS) interventions, and ensuring backup power availability, with real-time islanding capabilities when the grid is unstable or offline. This holistic approach provides a significant advancement in the field of distributed energy resource management, maximizing system performance while reducing operational risks and extending battery lifespan.

The DAMAML framework for BESSs coordinates a plurality of software agents operating in their own learning environments to optimize energy arbitrage, preserve battery health, manage charging or power schedules for external devices or systems, and ensure reliable backup power. Each software agent in the DAMAML framework operates in a learning environment comprising data, methods, models, and constraints associated with a particular field, goal, application, or subsystem. This allows each agent to independently optimize the various factors associated with operation of a BESS, while having a coordinator agent optimize the operation of the overall system by resolving conflicts between other agents, provide operational balance, and prevent unsafe or excessive operations that might degrade battery health or compromise system reliability.

In some embodiments, one or more of the machine learning algorithms may be a reinforcement learning algorithm in which rewards are assigned to successful outcomes and/or penalties are assigned to unsuccessful outcomes. In some embodiments, agents may use different types of machine learning algorithms. In some embodiments, a plurality of agents may share the use of a machine learning algorithm.

In an embodiment, the system and method comprise management and control of electric vehicle (EV) charging stations connected bi-directionally to an electrical power grid wherein degradation-aware multi-agent machine learning is used to simultaneously optimize multiple factors in the EV charging station environment including energy arbitrage including real-time pricing, battery health of both the EVs being charged and backup batteries connected to the EV charging stations, charging schedules of EVs, and backup power management provided by the backup batteries connected to the EV charging stations.

In an embodiment, a system for management and control of battery energy storage systems in complex and dynamic multi-factor environments using a degradation-aware multi-agent machine learning framework comprises a central controller which gathers current data about various environments and feeds the data to one or more agents as well as controlling hardware based on directives received from a coordinator agent; a coordinator agent which orchestrates the outputs of one or more agents responsible for evaluating learning environments that affect the system in some way; an energy arbitrage agent configured to optimize market-related factors; an electrical vehicle charging agent configured to optimize charging-related factors; a battery management system agent configured to optimize battery-life-related factors; and a backup power agent configured to optimize backup-power-related factors.

In an embodiment, central controller is responsible for receiving current market data, charging demand data, system telemetry data, and grid status data, and distributing the data to the agents responsible for optimizing that data. Central controller receives instructions from coordinator agent and implements the instructions by operating one or more hardware components. In some embodiments, central controller execution logs and/or other system logs may be used to further improve the central controller over time.

In an embodiment, coordinator agent orchestrates the outputs of one or more agents associated with the various learning environments in which other agents are operating. Coordinator agent receives outputs from energy arbitrage agent, EV scheduling agent, battery management service agent, and backup power agent into its coordinator agent learning environment to ensuring alignment with global system optimization objectives, adjust operational constraints, perform conflict resolution between the other agent outputs, to perform operational balance for the system as a whole. The outputs of coordinator agent are final instructions to central controller for operation of the system hardware. The outputs of coordinator agent are made by applying a machine learning algorithm to a coordinator agent learning environment comprising data such as global system optimization objectives, operational constraints, user satisfaction goals, battery longevity goals, system resilience goals, site energy consumption data, system execution logs, and other system-level or network-level goals, objectives, priorities, constraints, and optimization parameters. The final instructions may be directed at any number of such goals, objectives, priorities, constraints, and optimization parameters which may either be entered into the coordinator agent learning environment or identified by the machine learning algorithm based on data in the coordinator agent learning environment. As an example, coordinator agent and its learning environment may be configured to balance revenue generation, user satisfaction, battery longevity, resolving local grid outages, and system resilience. In some embodiments, coordinator agent execution logs and/or other system logs may be used to further improve the coordinator agent over time).

In an embodiment, an energy arbitrage agent is configured to optimize market-related factors such as market pricing, market pricing trends, charge/discharge/power demand, grid service participation, and the condition of any batteries being charged or discharged, and outputs predictions, recommendations, or both, for market-related factors such as charge/discharge schedules, revenue forecasts, charging costs, and battery constraints. The predictions, recommendations, or both, are made by applying a machine learning algorithm to a battery arbitrage learning environment comprising energy arbitrage data. The predictions, recommendations, or both, may be directed at any number of priorities and optimization parameters which may either be entered into the battery arbitrage learning environment or identified by the machine learning algorithm based on data in the battery arbitrage learning environment. In an embodiment, the energy arbitrage agent is configured to predict one or more preferred times to perform energy arbitrage. For example, energy arbitrage agent may detect a slope-based power price increase and thus recommends to charge the system until a price-based threshold is reached, or to wait to charge the system until the power price is predicted to drop. As one example of power price determination, the energy arbitrage agent may use technical signals that are commonly used in energy commodities trading.

In an embodiment, an electrical vehicle charging agent is configured to optimize charging-related factors such as power allocation schedules for EVs, charging priorities, EV charging demand, queue length, user requirements, and EV battery history & condition, and outputs predictions, recommendations, or both, for charging-related factors such as recommended EV charging schedules, backup battery charging schedules, service level agreements with EV charging station operators, and demand forecasts. The predictions, recommendations, or both, are made by applying a machine learning algorithm to an electric vehicle charging learning environment comprising EV charging data. The predictions, recommendations, or both, may be directed at any number of priorities and optimization parameters which may either be entered into the electric vehicle charging learning environment or identified by the machine learning algorithm based on data in the electric vehicle charging learning environment.

In an embodiment, a battery management system agent is configured to optimize battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. Battery management system outputs predictions, recommendations, or both, for battery life management such as battery degradation forecasts, operational constraints, and thermal management controls. The predictions, recommendations, or both, are made by applying a machine learning algorithm to either a short-term battery physics learning environment comprising data related to short-term battery physics, a long-term battery degradation learning environment comprising data related to long-term battery degradation, or both. The predictions, recommendations, or both, may be directed at any number of priorities and optimization parameters which may either be entered into the short-term battery physics learning environment and long-term battery degradation learning environment or identified by the machine learning algorithm based on data in either or both of those learning environments. As an example, a battery degradation model may be included in either the short-term battery physics learning environment or the long-term battery degradation learning environment to associate each possible system action with metrics such as predicted capacity loss over time, thermal concerns, battery failure probability, etc.

In an embodiment, a backup power agent is configured to optimize backup power factors such as grid status, proactive identification of local grid outages or grid stressor events, grid power transitions, available backup power, backup activations, power allocations, mode transition priorities, critical load thresholds, and outputs predictions, recommendations, or both, for backup power factors such as backup power activation (also called "islanding"), critical load requirements, and backup power capacity and status. The predictions, recommendations, or both, are made by applying a machine learning algorithm to a backup power learning environment comprising backup power data. The predictions, recommendations, or both, may be directed at any number of priorities and optimization parameters which may either be entered into the backup power learning environment or identified by the machine learning algorithm based on data in the backup power learning environment.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

The skilled person will be aware of a range of possible modifications of the various embodiments described herein. Accordingly, the present invention is defined by the claims and their equivalents.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Degradation-aware multi-agent machine learning" or "DAMAML" as used herein means a machine learning framework wherein a plurality of machine learning agents each optimize factors associated with their own learning environments using one or more machine learning algorithms, and wherein at least one of the machine learning agents optimizes factors associated with battery degradation of a battery being charged.

"Degradation-aware multi-agent reinforcement learning" or "DAMARL" as used herein means a machine learning framework wherein a plurality of machine learning agents each optimize factors associated with their own learning environments using one or more machine learning algorithms, and wherein at least one of the machine learning agents optimizes factors associated with battery degradation of a battery being charged and wherein at least one of the agents uses a reinforcement-type machine learning algorithm in which rewards are assigned to successful outcomes and/or penalties are assigned to unsuccessful outcomes.

"Machine learning" or "machine learning algorithm" as used herein is an aspect of artificial intelligence in which the computer system or component can modify its behavior or understanding without being explicitly programmed to do so. Machine learning algorithms excel at finding patterns in complex data or exploring the outcomes of large numbers of potential options. There are three primary categories of machine learning algorithms, supervised machine learning algorithms, unsupervised machine learning algorithms, and reinforcement machine learning algorithms. Supervised machine learning algorithms are trained to recognize patterns by training them with labeled training data. For example, a supervised machine learning algorithm may be fed pictures of oranges with the label "orange" and pictures of basketballs with the label basketball. The supervised machine learning algorithm will identify similarities (e.g., orange color, round shape, bumpy surface texture) and differences (e.g., black lines on basketball, regular dot pattern texture on basketball versus random texture on oranges) among the pictures to teach itself how to properly classify unlabeled pictures input after training. An unsupervised machine learning algorithm learns from the data itself by association, clustering, or dimensionality reduction, rather than having been pre-trained to discriminate between labeled input data. Unsupervised machine learning algorithms are ideal for identifying previously unknown patterns within data. Reinforcement machine learning algorithms learn from repeated iterations of outcomes based on probabilities with successful outcomes being rewarded or unsuccessful outcomes being penalized. Reinforcement machine learning algorithms are ideal for exploring large number of possible outcomes such as possible outcomes from different moves on a chess board.

"Multi-agent machine learning" or "MAML" as used herein means a machine learning framework wherein a plurality of machine learning agents each optimize factors associated with their own learning environments using one or more machine learning algorithms. In the context of battery energy storage systems, a plurality of machine learning agents each optimize factors associated with their own learning environments in battery energy storage system environments such as energy arbitrage, battery health, charging schedules, and backup power.

DETAILED DESCRIPTION OF THE DRAWING FIGURES

FIG. 1 is a block diagram illustrating an exemplary system architecture for a system 100 for management and control of battery energy storage systems in complex and dynamic multi-factor environments using a degradation-aware multi-agent machine learning framework. In this embodiment, system 100 comprises hardware 110 for providing power to external systems and software 120 for controlling the hardware 110. A non-limiting example of external systems to which power may be provided by system 100 is power provided to charge electric vehicles.

Hardware 110 of this embodiment comprises an alternating current to direct current (AC-to-DC) converter 111 for converting alternating current from a power grid to direct current for charging batteries and vice-versa at rates and directions directed by a central controller, a thermal manager 112 for preventing over-temperature conditions in components of the system such as batteries by utilizing thresholds and activating heating/cooling as directed by central controller, an electric vehicle service exchange (EVSE) 113 which manages charging queues and allocates power to EVs connected to the charging system, a battery manager 114 for managing battery usage and degradation as directed by central controller, and an automatic transfer switch 115 for connecting to and disconnecting from the power grid as directed by central controller. Note that not all hardware components of system 100 are shown. Hardware components required to make the described system operational may be assumed by a person of ordinary skill in the art. For example, a backup battery may be assumed from the existence of battery manager 114 but is not shown.

Software 120 of this embodiment comprises a central controller 200 which gathers current data about various environments and feeds the data to one or more agents as well as controlling hardware based on directives received from a coordinator agent; a coordinator agent 300 which orchestrates the outputs of one or more agents responsible for evaluating learning environments that affect the system in some way; an energy arbitrage agent 400 configured to optimize market-related factors; an electrical vehicle charging agent 500 configured to optimize charging-related factors; a battery management system agent 500 configured to optimize battery-life-related factors; and a backup power agent 700 configured to optimize backup-power-related factors.

Central controller 200 of this embodiment is responsible for receiving current market data, charging demand data, system telemetry data, and grid status data, and distributing the data to the agents responsible for optimizing that data. Central controller 200 receives instructions from coordinator agent 300 and implements the instructions by operating one or more hardware 110 components.

Coordinator agent 300 orchestrates the outputs of one or more agents associated with the various learning environments in which other agents are operating. Coordinator agent receives outputs from energy arbitrage agent, EV scheduling agent, battery management service agent, and backup power agent into its coordinator agent learning environment to ensuring alignment with global system optimization objectives, adjust operational constraints, perform conflict resolution between the other agent outputs, to perform operational balance for the system as a whole. The outputs of coordinator agent 300 are final instructions to central controller 200 for operation of the system hardware 110. The outputs of coordinator agent are made by applying a machine learning algorithm to the received inputs from the other agents in conjunction with a coordinator agent learning environment comprising coordination environment data such as global system optimization objectives, operational constraints, user satisfaction goals, battery longevity goals, resolving local grid outages, system resilience goals, and other system-level or network-level goals, objectives, priorities, constraints, and optimization parameters. The final instructions may be directed at any number of such goals, objectives, priorities, constraints, and optimization parameters which may either be entered into the coordinator agent learning environment or identified by the machine learning algorithm based on data in the coordinator agent learning environment. As an example, coordinator agent and its learning environment may be configured to balance revenue generation, user satisfaction, battery longevity, and system resilience.

Energy arbitrage agent 400 of this embodiment is configured to optimize market-related factors. The predictions, recommendations, or both, are made by applying a machine learning algorithm to market-related data received from central controller 200 in conjunction with a battery arbitrage learning environment comprising energy arbitrage environment data such as market pricing, market pricing trends, charge/discharge/power demand, grid service participation, and the condition of any batteries being charged or discharged, and outputs predictions, recommendations, or both, for market-related factors such as charge/discharge schedules, revenue forecasts, charging costs, and battery constraints. The predictions, recommendations, or both, may be directed at any number of priorities and optimization parameters which may either be entered into the battery arbitrage learning environment or identified by the machine learning algorithm based on data in the battery arbitrage learning environment. In an embodiment, the energy arbitrage agent is configured to predict one or more preferred times to perform energy arbitrage. For example, energy arbitrage agent may detect a slope-based power price increase and thus recommends to charge the system until a price-based threshold is reached, or to wait to charge the system until the power price is predicted to drop. As one example of power price determination, the energy arbitrage agent may use technical signals that are commonly used in energy commodities trading.

Electric vehicle charging agent 500 of this embodiment is configured to optimize charging-related factors. The predictions, recommendations, or both, are made by applying a machine learning algorithm to EV charging data received from central controller 200 in conjunction with an electric vehicle charging learning environment comprising EV charging environment data such as power allocation schedules for EVs, charging priorities, EV charging demand, queue length, user requirements, and EV battery history & condition, and outputs predictions, recommendations, or both, for charging-related factors such as recommended EV charging schedules, backup battery charging schedules, service level agreement for EV charging station operators, and demand forecasts. The predictions, recommendations, or both, may be directed at any number of priorities and optimization parameters which may either be entered into the electric vehicle charging learning environment or identified by the machine learning algorithm based on data in the electric vehicle charging learning environment.

Battery management system agent 600 is configured to optimize battery-life-related factors. Battery management system agent 600 outputs predictions, recommendations, or both, for battery life management such as battery degradation forecasts, operational constraints, and thermal management controls. The predictions, recommendations, or both, are made by applying a machine learning algorithm to battery management system environment data. The battery management system environment data may comprise a short-term battery physics learning environment comprising battery management system environment data related to short-term battery physics, a long-term battery degradation learning environment comprising battery management system environment data related to long-term battery degradation, or both. Such battery management system environment data may include such factors as short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. The predictions, recommendations, or both, may be directed at any number of priorities and optimization parameters which may either be entered into the short-term battery physics learning environment and long-term battery degradation learning environment or identified by the machine learning algorithm based on data in the either or both of those learning environments.

Backup power agent 700 of this embodiment is configured to optimize backup power factors. The predictions, recommendations, or both, are made by applying a machine learning algorithm to grid status data in conjunction with a backup power learning environment comprising backup power environment data such as grid status, proactive identification of local grid outages or grid stressor events, grid power transitions, available backup power, backup activations, power allocations, mode transition priorities, critical load thresholds, and outputs predictions, recommendations, or both, for backup power factors such as backup power activation (also called "islanding"), critical load requirements, and backup power capacity and status. The predictions, recommendations, or both, may be directed at any number of priorities and optimization parameters which may either be entered into the backup power learning environment or identified by the machine learning algorithm based on data in the backup power learning environment.

Figure 2:
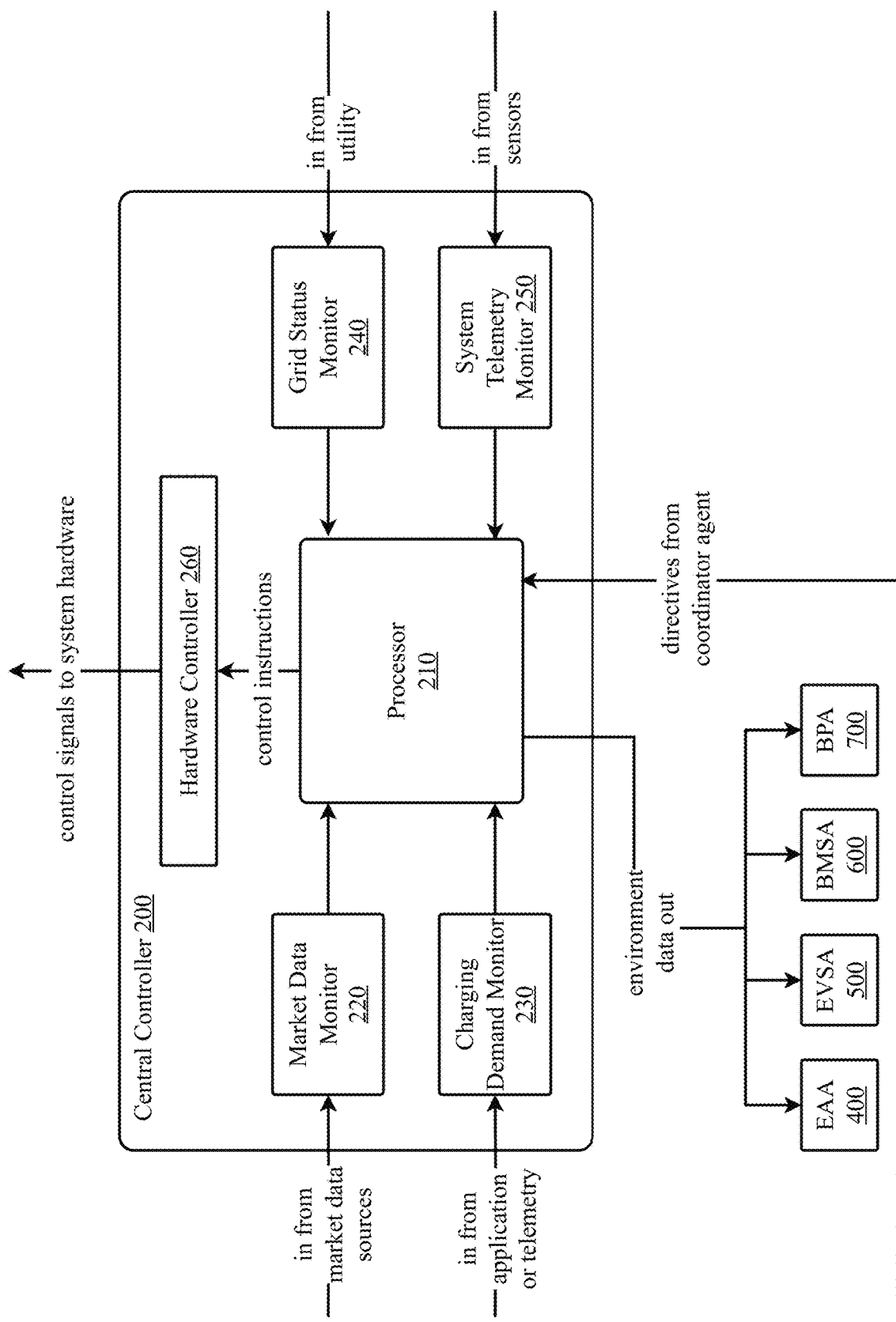
FIG. 2 is a block diagram illustrating a central controller aspect of a system for management and control of battery energy storage systems in complex and dynamic multi-factor environments using a degradation-aware multi-agent machine learning framework.

FIG. 2 is a block diagram illustrating a central controller aspect of a system for management and control of battery energy storage systems in complex and dynamic multi-factor environments using a degradation-aware multi-agent machine learning framework. Central controller 200 of this embodiment is responsible for receiving current market data, charging demand data, system telemetry data, and grid status data, and distributing the data to the agents responsible for optimizing that data. Central controller 200 receives instructions from coordinator agent 300 and implements the instructions by operating one or more hardware 110 components. Central controller 200 of this embodiment comprises a processor 210, a market data monitor 220, a charging demand monitor 230, a grid status monitor 240, a system telemetry monitor 250 and one or more hardware controllers 260.

Processor 210 receives current market data, charging demand data, system telemetry data, and grid status data, and distributing the data to the agents responsible for optimizing that data. In this embodiment, processor 210 forwards the current market data to energy arbitrage agent 400, charging demand data to EV service agent 500, system telemetry data to battery management service agent 600, and grid status data to backup power agent 700.

Market data monitor 220 receives current market data from market data sources such as published utility rates, dynamic pricing rates from utilities, trade publications, utility rate databases, utility rate servers, application programming interfaces (APIs), and similar sources of information. Market data monitor 220 may be an application running on a computer, a web application operating in an Internet browser of a computer, or any suitable similar software capable of connecting to the Internet to obtain current data.

Charging demand monitor 230 receives current charging demand data from data sources such as published charging demand data, real-time charging information from operators of charging stations, trade publications, historical demand databases, application programming interfaces (APIs), and software applications which allow for reservations or scheduling of EV charging (e.g., mobile phone applications with EV charging station reservation capabilities). Charging demand monitor 230 may be an application running on a computer, a web application operating in an Internet browser of a computer, or any suitable similar software capable of connecting to the Internet to obtain current data.

Grid status monitor 240 receives current grid status data either from the utility operating the grid or from data sources such as published information on utility status, trade publications, historical databases, application programming interfaces (APIs), and similar sources of information. Grid status monitor 240 may be an application running on a computer, a web application operating in an Internet browser of a computer, or any suitable similar software capable of connecting to the Internet to obtain current data.

System telemetry monitor 250 receives current hardware status data from sensors attached to or associated with hardware 110 connected to system 100. System telemetry monitor 250 may be a microcontroller directly connected to the sensors, an application running on a computer which receives sensor data wirelessly, a web application operating in an Internet browser of a computer which receives sensor data from a web server, or any suitable similar software or hardware capable of receiving sensor data associated with hardware 110 connected to system 100.

Hardware controllers 260 are devices which control the operation of hardware components 110 of system based on instructions from central controller 200. Examples of hardware controllers are microcontrollers, motor controllers, signal relays, power relays, voltage regulators, and other devices which control the operation of hardware components.

Figure 3:
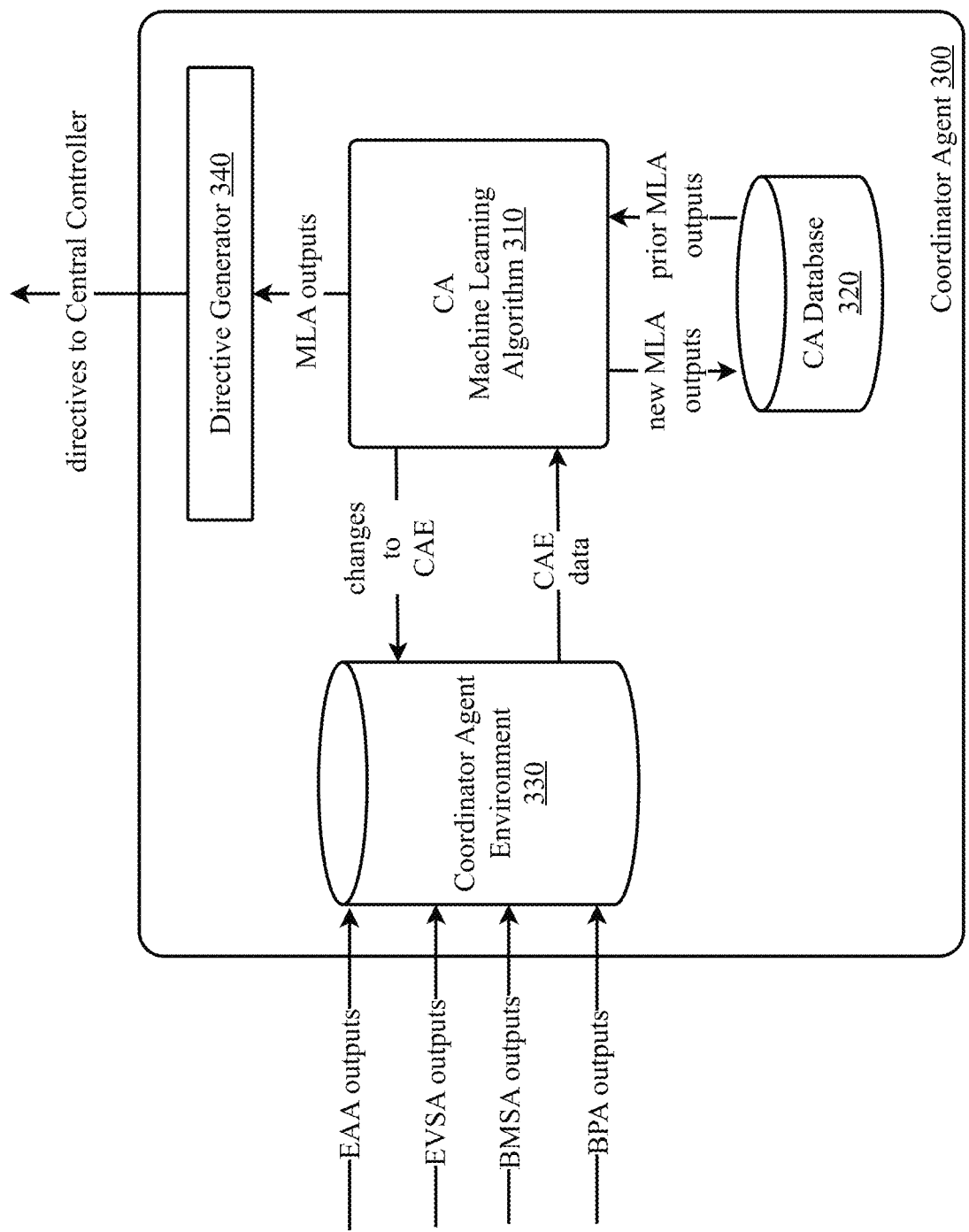
FIG. 3 is a block diagram illustrating a coordinator agent aspect of a system for management and control of battery energy storage systems in complex and dynamic multi-factor environments using a degradation-aware multi-agent machine learning framework.

FIG. 3 is a block diagram illustrating a coordinator agent aspect of a system for management and control of battery energy storage systems in complex and dynamic multi-factor environments using a degradation-aware multi-agent machine learning framework. Coordinator agent 300 orchestrates the outputs of one or more agents associated with the various learning environments in which other agents are operating. Coordinator agent 300 receives outputs from energy arbitrage agent 400, EV scheduling agent 500, battery management service agent 600, and backup power agent 700 into its coordinator agent learning environment to ensuring alignment with global system optimization objectives, adjust operational constraints, perform conflict resolution between the other agent outputs, to perform operational balance for the system as a whole. The outputs of coordinator agent are final instructions to central controller 200 for operation of the system hardware 110.

The outputs of coordinator agent are made by applying a machine learning algorithm to a coordinator agent learning environment comprising data such as global system optimization objectives, operational constraints, user satisfaction goals, battery longevity goals, system resilience goals, site energy consumption data, system execution logs, and other system-level or network-level goals, objectives, priorities, constraints, and optimization parameters. The final instructions may be directed at any number of such goals, objectives, priorities, constraints, and optimization parameters which may either be entered into the coordinator agent learning environment or identified by the machine learning algorithm based on data in the coordinator agent learning environment. As an example, coordinator agent and its learning environment may be configured to balance revenue generation, user satisfaction, battery longevity, and system resilience. In some embodiments, coordinator agent execution logs and/or other system logs may be used to further improve the coordinator agent over time).

Coordinator agent 300 of this embodiment comprises a coordinator agent machine learning algorithm 310, a coordinator agent database 320, a coordinator agent learning environment 330, and a directive generator 340. In other embodiments, coordinator agent may be a different type of decision-making algorithm such as a non-agent-based machine learning algorithm or a simpler rules-based or heuristic decision-making algorithm.

Coordinator agent machine learning algorithm 310 is a machine learning algorithm trained to optimize global system objectives, operational constraints, user satisfaction goals, battery longevity goals, system resilience goals, and other system-level or network-level goals, objectives, priorities, constraints, and optimization parameters. It may do so in part by resolving conflicts between the outputs of other agents, such as energy arbitrage agent 400, EV scheduling agent 500, battery management service agent 600, and backup power agent 700, whose outputs may contain or result in conflicting recommendations. Coordinator agent 300 receives outputs from energy arbitrage agent 400, EV scheduling agent 500, battery management service agent 600, and backup power agent 700 into its coordinator agent learning environment. It applies CA machine learning algorithm 310 to the outputs of the other agents in conjunction with coordinator agent environment 330 by retrieving data from coordinator agent environment 330 and, in some cases, prior outputs from CA machine learning algorithm 310 which may be stored in coordinator agent database 320. Outputs from CA machine learning algorithm 310 are sent to directive generator 340 where they are converted into operating directives for central controller 200 to implement in the hardware 110. Outputs from CA machine learning algorithm 310 may also be used to make changes to coordinator agent environment. For example, if CA machine learning algorithm 310 detects a pattern of recommendations from the other agents that would result in overheating of the system's backup battery, CA machine learning algorithm may change the coordinator agent environment to disallow that pattern of recommendations. Outputs from CA machine learning algorithm 310 may also be stored in CA database 320 for retrieval and application to future analyses by CA machine learning algorithm 310. For example, where an analysis will the same or similar parameters has already been performed, CA machine learning algorithm may simply retrieve and use the previous analysis rather than re-performing the analysis, which can increase the speed and responsiveness of system 100.

Figure 4:
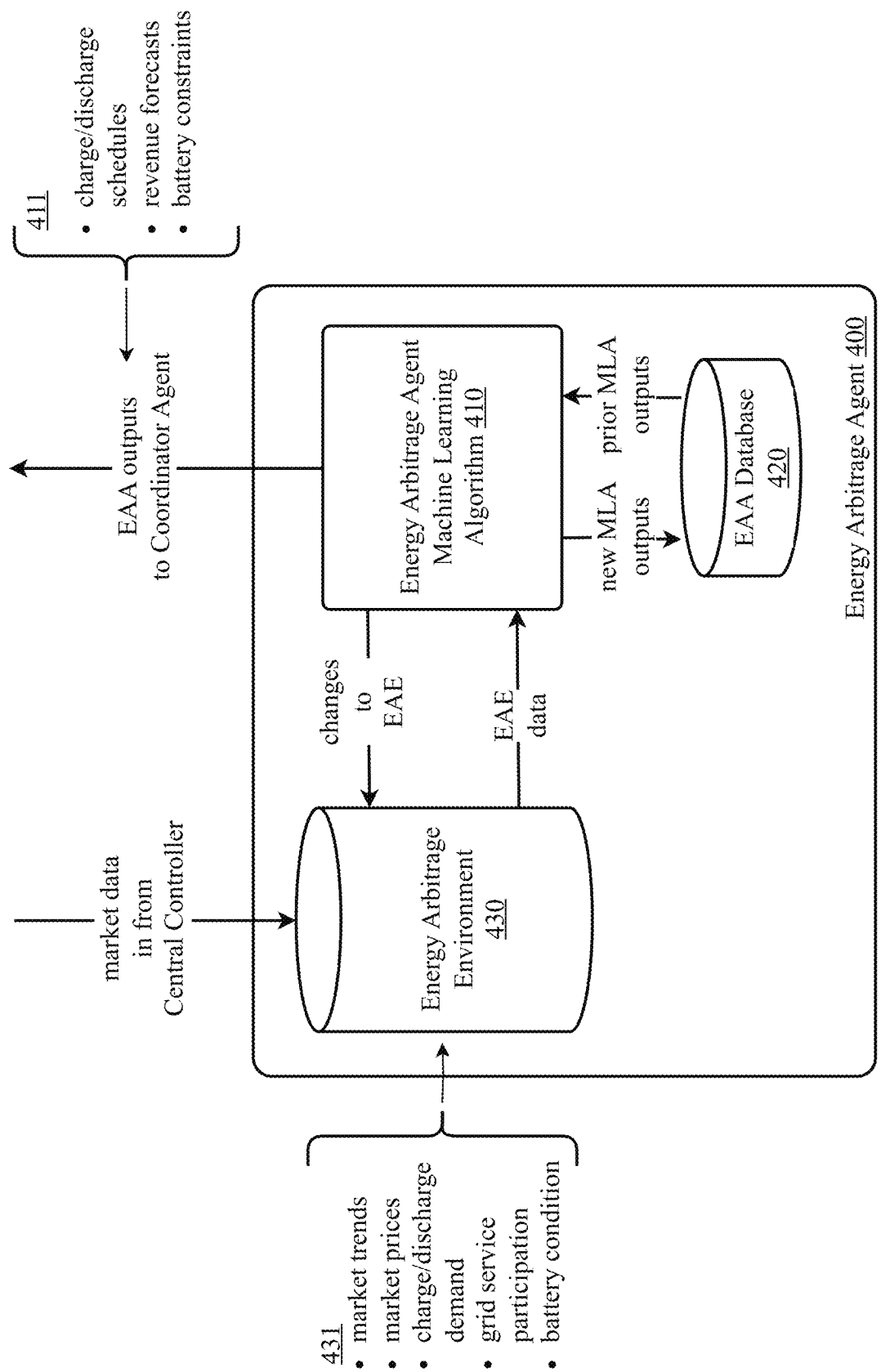
FIG. 4 is a block diagram illustrating an energy arbitrage agent aspect of a system for management and control of battery energy storage systems in complex and dynamic multi-factor environments using a degradation-aware multi-agent machine learning framework.

FIG. 4 is a block diagram illustrating an energy arbitrage agent aspect of a system for management and control of battery energy storage systems in complex and dynamic multi-factor environments using a degradation-aware multi-agent machine learning framework.

In an embodiment, an energy arbitrage agent (EAA) 400 is configured to optimize market-related factors such as market pricing, market pricing trends, charge/discharge/power demand, grid service participation, and the condition of any batteries being charged or discharged, and outputs predictions, recommendations, or both, for market-related factors such as charge/discharge schedules, revenue forecasts, charging costs, and battery constraints. The predictions, recommendations, or both, are made by applying an energy arbitrage agent (EAA) machine learning algorithm 410 to market-related data received from central controller 200 in conjunction with an energy arbitrage agent (EAA) learning environment 430 comprising energy arbitrage data. The predictions, recommendations, or both, may be directed at any number of priorities and optimization parameters which may either be entered into EAA learning environment 430 or identified by the EAA machine learning algorithm 410 based on data in EAA learning environment 430. The outputs of EAA machine learning algorithm 410 may be stored in an energy arbitrage agent (EAA) database 420 for later retrieval.

EAA machine learning algorithm 410 is a machine learning algorithm trained to optimize market-related factors such as market pricing, market pricing trends, charge/discharge/power demand, grid service participation, and the condition of any batteries being charged or discharged, and outputs predictions, recommendations, or both, for market-related factors such as charge/discharge schedules, revenue forecasts, charging costs, and battery constraints. Energy arbitrage agent 400 applies EAA machine learning algorithm 410 to market-related data received from central controller 200 in conjunction with to EAA learning environment 430 by retrieving data from EAA learning environment 430 and, in some cases, prior outputs from EAA machine learning algorithm 410 which may be stored in energy arbitrage agent database 420. Outputs EAA machine learning algorithm 410 are sent to coordinator agent 300 where they are analyzed with outputs from other agents before being converted into operating directives for central controller 200 to implement in the hardware 110. Outputs from EAA machine learning algorithm 410 may also be used to make changes to EAA environment 420. For example, if EAA machine learning algorithm 410 detects a pattern of data in EAA environment 420 that would result in catastrophic failure to meet charging demands, EAA learning algorithm 410 may change EAA environment 430 to disregard that pattern of data. Outputs from EAA machine learning algorithm 410 may also be stored in energy arbitrage agent (EAA) database 420 for retrieval and application to future analyses by EAA machine learning algorithm 410. For example, where an analysis will the same or similar parameters has already been performed, EAA machine learning algorithm 410 may simply retrieve and use the previous analysis rather than re-performing the analysis, which can increase the speed and responsiveness of system 100.

Figure 5:
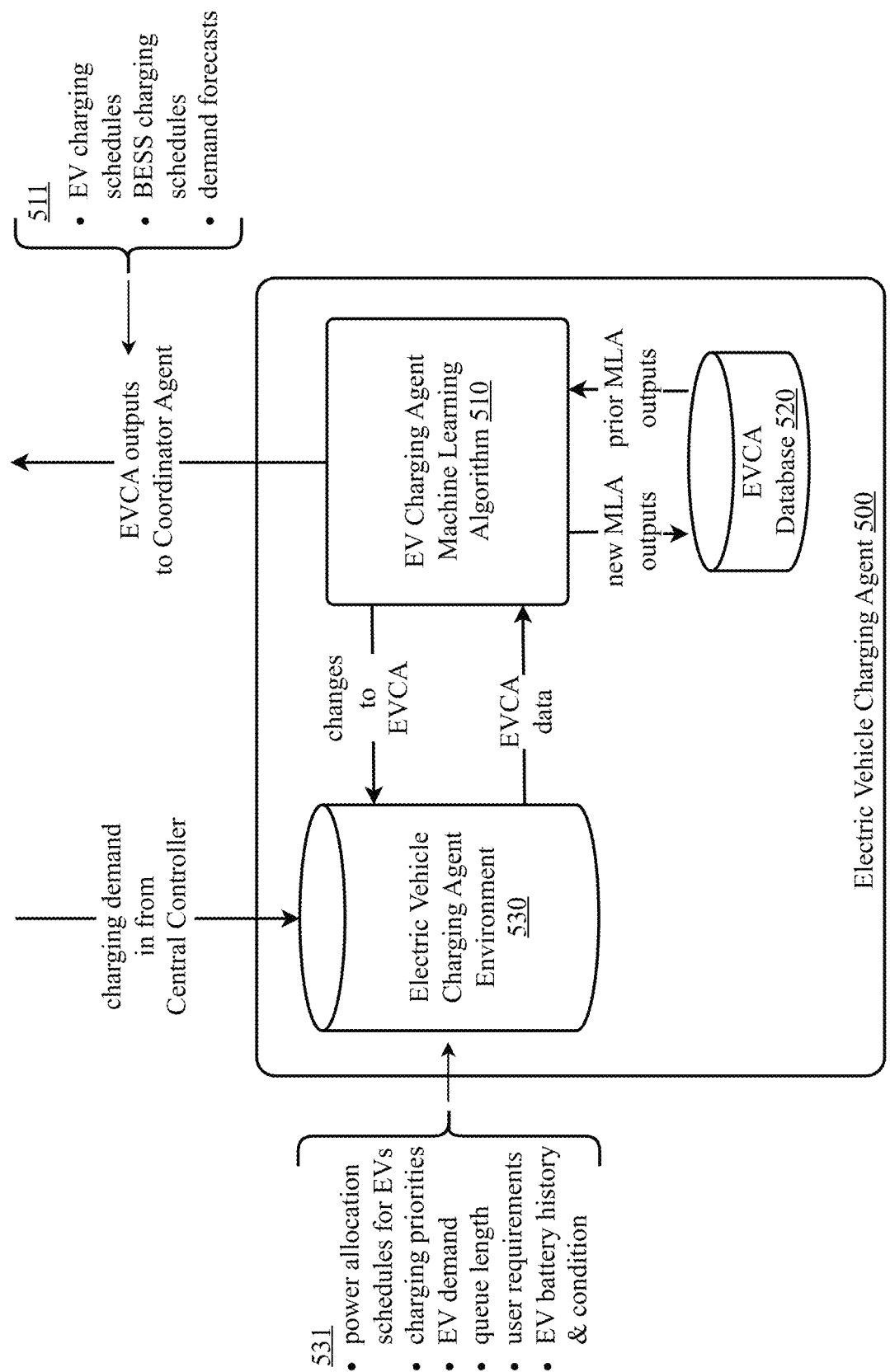
FIG. 5 is a block diagram illustrating an electric vehicle charging agent aspect of a system for management and control of battery energy storage systems in complex and dynamic multi-factor environments using a degradation-aware multi-agent machine learning framework.

FIG. 5 is a block diagram illustrating an electric vehicle charging agent aspect of a system for management and control of battery energy storage systems in complex and dynamic multi-factor environments using a degradation-aware multi-agent machine learning framework.

Electrical vehicle charging agent (EVCA) 500 of this embodiment is configured to optimize charging-related factors such as power allocation schedules for electric vehicles (EVs), charging priorities, EV charging demand, queue length, user requirements, and EV battery history & condition, and outputs predictions, recommendations, or both, for charging-related factors such as recommended EV charging schedules, backup battery charging schedules, and demand forecasts. The predictions, recommendations, or both, are made by applying an electric vehicle charging agent (EVCA) machine learning algorithm 510 to EV charging data received from central controller 200 in conjunction with an electric vehicle charging agent (EVCA) learning environment 530 comprising EV charging data. The predictions, recommendations, or both, may be directed at any number of priorities and optimization parameters which may either be entered into EVCA learning environment 530 or identified by the EVCA machine learning algorithm 510 based on data in the EVCA learning environment 530. The outputs of EVCA machine learning algorithm 410 may be stored in an electric vehicle charging agent (EVCA) database 420 for later retrieval.

EVCA machine learning algorithm 510 is a machine learning algorithm trained to optimize charging-related factors such as power allocation schedules for electric vehicles (EVs), charging priorities, EV charging demand, queue length, user requirements, and EV battery history & condition, and outputs predictions, recommendations, or both, for charging-related factors such as recommended EV charging schedules, backup battery charging schedules, and demand forecasts. Electric vehicle charging agent 500 applies EVCA machine learning algorithm 510 to EV charging data received from central controller 200 in conjunction with EVCA learning environment 530 by retrieving data from EVCA learning environment 530 and, in some cases, prior outputs from EVCA machine learning algorithm 510 which may be stored in EVCA database 520. Outputs of EVCA machine learning algorithm 510 are sent to coordinator agent 300 where they are analyzed with outputs from other agents before being converted into operating directives for central controller 200 to implement in the hardware 110. Outputs from EVCA machine learning algorithm 510 may also be used to make changes to EVCA environment 520. For example, if EVCA machine learning algorithm 510 detects a pattern of data in EVCA environment 520 that would result in overcharging of a particular type of electric vehicle, EVCA learning algorithm 510 may change EVCA environment 530 to disregard that pattern of data. Outputs from EVCA machine learning algorithm 510 may also be stored in EVCA database 520 for retrieval and application to future analyses by EVCA machine learning algorithm 510. For example, where an analysis will the same or similar parameters has already been performed, EVCA machine learning algorithm 510 may simply retrieve and use the previous analysis rather than re-performing the analysis, which can increase the speed and responsiveness of system 100.

Figure 6:
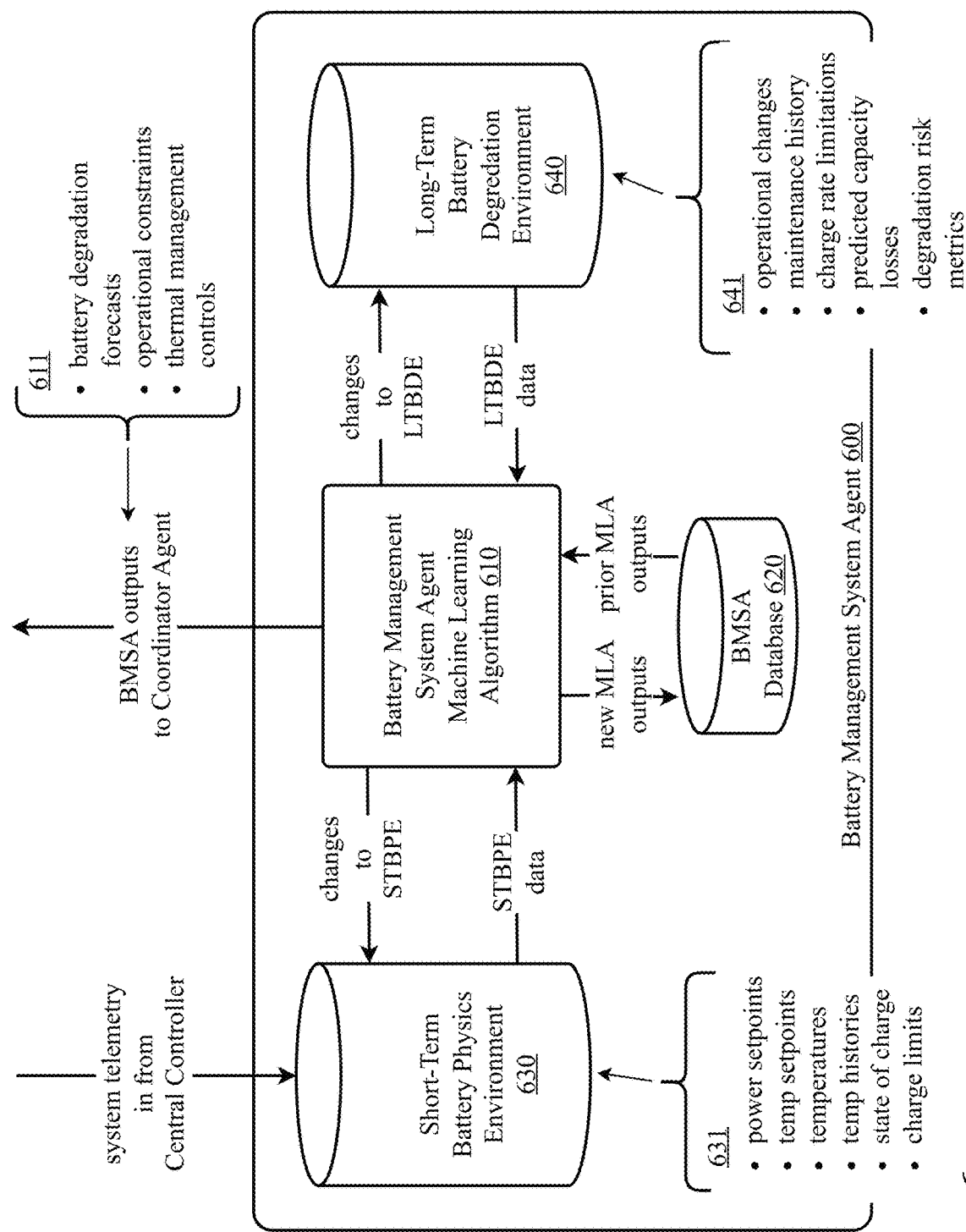
FIG. 6 is a block diagram illustrating a battery management system agent aspect of a system for management and control of battery energy storage systems in complex and dynamic multi-factor environments using a degradation-aware multi-agent machine learning framework.

FIG. 6 is a block diagram illustrating a battery management system agent aspect of a system for management and control of battery energy storage systems in complex and dynamic multi-factor environments using a degradation-aware multi-agent machine learning framework.

Battery management system agent (BMSA) 600 of this embodiment is configured to optimize battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. Battery management system agent 600 outputs predictions, recommendations, or both, for battery life management such as battery degradation forecasts, operational constraints, and thermal management controls. The predictions, recommendations, or both, are made by applying a battery management system agent (BMSA) machine learning algorithm 610 to system telemetry data received from central controller 200 in conjunction with either a short-term battery physics learning environment (STBPE) 630 comprising data related to short-term battery physics, a long-term battery degradation learning environment (LTBDE) 640 comprising data related to long-term battery degradation, or both. The predictions, recommendations, or both, may be directed at any number of priorities and optimization parameters which may either be entered into the short-term battery physics learning environment and long-term battery degradation learning environment or identified by BMSA machine learning algorithm 610 based on data in the either or both of those learning environments 630, 640. The outputs of BMSA machine learning algorithm 610 may be stored in a battery management system agent (BMSA) database 620 for later retrieval.

BMSA machine learning algorithm 610 is a machine learning algorithm trained to optimize battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. Electric vehicle charging agent 600 applies BMSA machine learning algorithm 610 to system telemetry data received from central controller 200 in conjunction with BMSA learning environment 630 by retrieving data from BMSA learning environment 630 and, in some cases, prior outputs from BMSA machine learning algorithm 610 which may be stored in BMSA database 620. Outputs of BMSA machine learning algorithm 610 are sent to coordinator agent 300 where they are analyzed with outputs from other agents before being converted into operating directives for central controller 200 to implement in the hardware 110. Outputs from BMSA machine learning algorithm 610 may also be used to make changes to BMSA environment 620. For example, if BMSA machine learning algorithm 610 detects a pattern of data in BMSA environment 620 that would result in overcharging of a particular type of electric vehicle, BMSA learning algorithm 610 may change BMSA environment 630 to disregard that pattern of data. Outputs from BMSA machine learning algorithm 610 may also be stored in BMSA database 620 for retrieval and application to future analyses by BMSA machine learning algorithm 610. For example, where an analysis will the same or similar parameters has already been performed, BMSA machine learning algorithm 610 may simply retrieve and use the previous analysis rather than re-performing the analysis, which can increase the speed and responsiveness of system 100.

Figure 7:
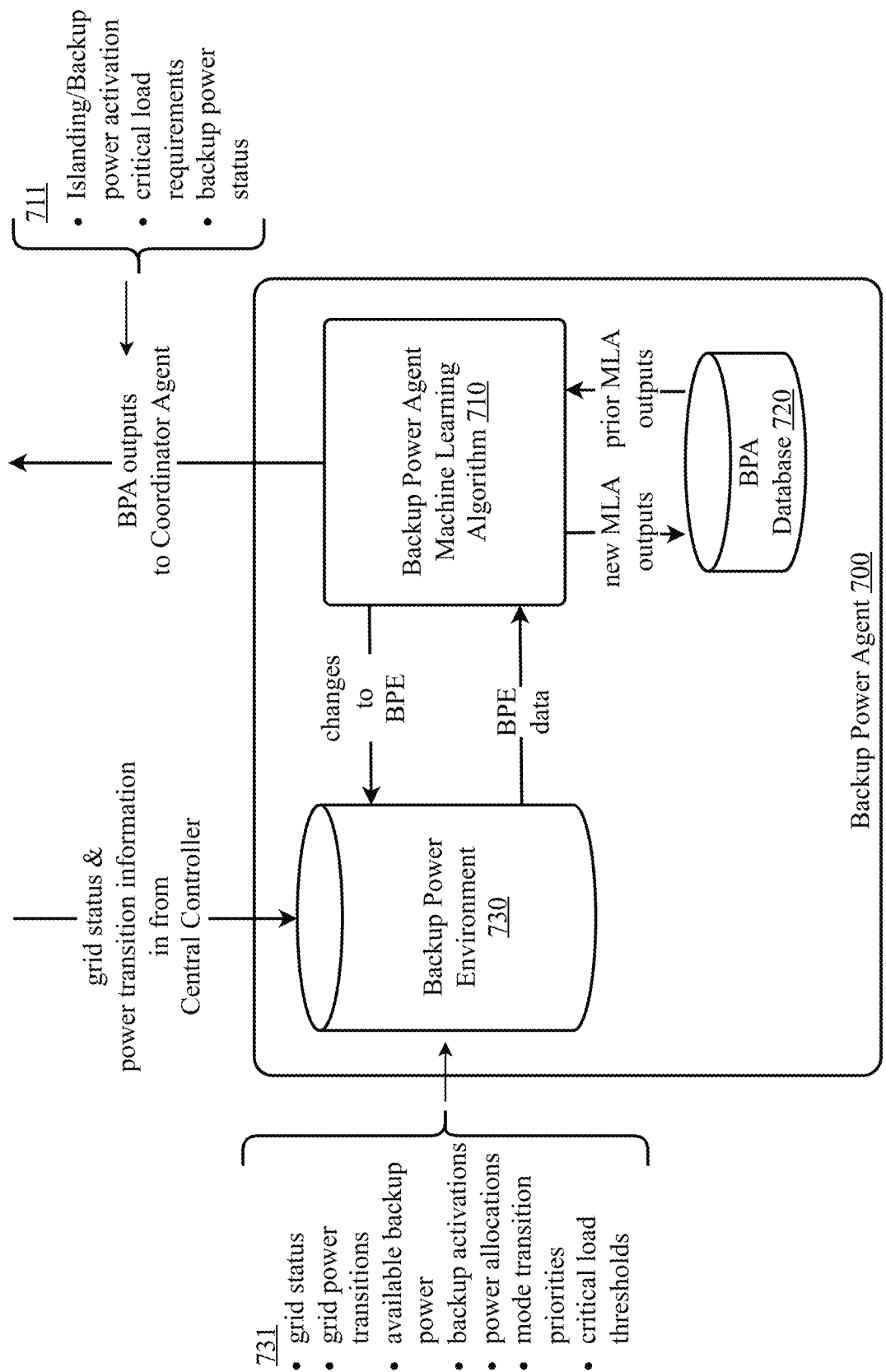
FIG. 7 is a block diagram illustrating a backup power agent aspect of a system for management and control of battery energy storage systems in complex and dynamic multi-factor environments using a degradation-aware multi-agent machine learning framework.

FIG. 7 is a block diagram illustrating a backup power agent aspect of a system for management and control of battery energy storage systems in complex and dynamic multi-factor environments using a degradation-aware multi-agent machine learning framework.

Backup power agent (BPA) 700 is configured to optimize backup power factors such as grid status, grid power transitions, available backup power, backup activations, power allocations, mode transition priorities, critical load thresholds, and outputs predictions, recommendations, or both, for backup power factors such as backup power activation (also called "islanding"), critical load requirements, and backup power capacity and status. The predictions, recommendations, or both, are made by applying a backup power agent (BPA) machine learning algorithm 710 to grid status data received from central controller 200 in conjunction with a backup power agent (BPA) learning environment 730 comprising backup power data. The predictions, recommendations, or both, may be directed at any number of priorities and optimization parameters which may either be entered into BPA learning environment 730 or identified by the BPA machine learning algorithm 710 based on data in the backup power learning environment. The outputs of BPA machine learning algorithm 710 may be stored in a backup power agent (BPA) database 620 for later retrieval.

BPA machine learning algorithm 610 is a machine learning algorithm trained to optimize battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. Electric vehicle charging agent 600 applies BPA machine learning algorithm 610 to grid status data received from central controller 200 in conjunction with BPA learning environment 630 by retrieving data from BPA learning environment 630 and, in some cases, prior outputs from BPA machine learning algorithm 610 which may be stored in BPA database 620. Outputs of BPA machine learning algorithm 610 are sent to coordinator agent 300 where they are analyzed with outputs from other agents before being converted into operating directives for central controller 200 to implement in the hardware 110. Outputs from BPA machine learning algorithm 610 may also be used to make changes to BPA environment 620. For example, if BPA machine learning algorithm 610 detects a pattern of data in BPA environment 620 that would result in overcharging of a particular type of electric vehicle, BPA learning algorithm 610 may change BPA environment 630 to disregard that pattern of data. Outputs from BPA machine learning algorithm 610 may also be stored in BPA database 620 for retrieval and application to future analyses by BPA machine learning algorithm 610. For example, where an analysis will the same or similar parameters has already been performed, BPA machine learning algorithm 610 may simply retrieve and use the previous analysis rather than re-performing the analysis, which can increase the speed and responsiveness of system 100.

Figure 8:
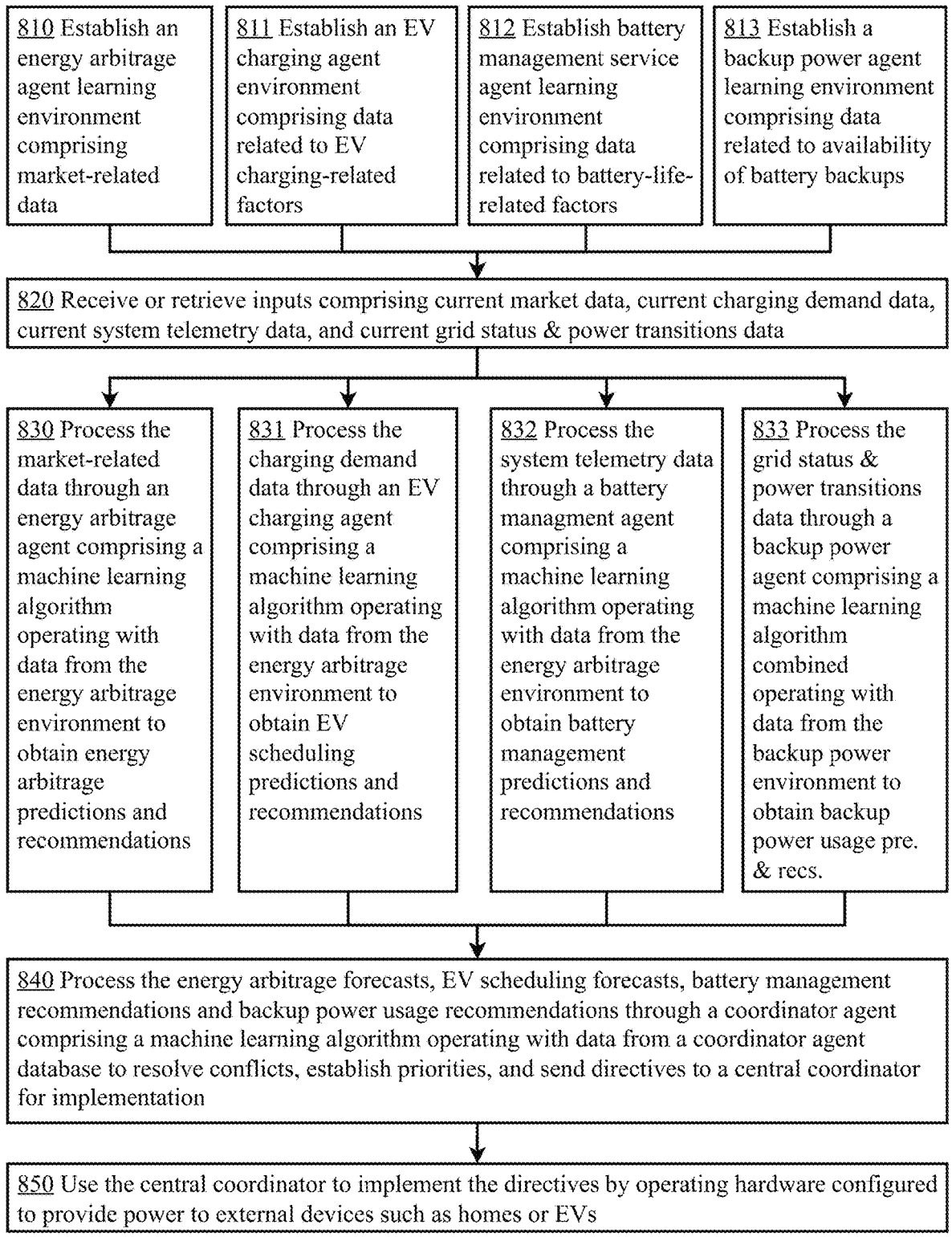
FIG. 8 is a flow diagram illustrating an exemplary method for management and control of battery energy storage systems in complex and dynamic multi-factor environments using a degradation-aware multi-agent machine learning framework.

FIG. 8 is a flow diagram illustrating an exemplary method 800 for management and control of battery energy storage systems in complex and dynamic multi-factor environments using a degradation-aware multi-agent machine learning framework.

At step 810, an energy arbitrage agent learning environment is established comprising energy arbitrage data related to market-related factors such as market pricing, market pricing trends, charge/discharge/power demand, grid service participation, and the condition of any batteries being charged or discharged. The energy arbitrage agent learning environment may be, for example, that described for EAA learning environment 430. At step 811, an EV charging agent learning environment is established comprising EV charging data related to charging-related factors such as power allocation schedules for EVs, charging priorities, EV charging demand, queue length, user requirements, and EV battery history & condition. The EV charging agent learning environment may be, for example, that described for EVCA learning environment 530. At step 812, a battery management service agent learning environment is established comprising battery management service data related to battery-life-related factors comprising short-term battery physics, long-term battery degradation, or both. Such battery-life-related factors may include such short-term battery physics factors as power setpoints, temp setpoints, temperatures, temperature histories, states of charge, and charge limits, and such long-term battery degradation factors as operational changes, maintenance histories, charge rate limitations, predicted capacity losses, and degradation risk metrics. The battery management service agent learning environment may be, for example, that described for BMSA learning environment 630. At step 813, a backup power agent learning environment is established comprising backup power data related to backup power factors such as grid status, grid power transitions, available backup power, backup activations, power allocations, mode transition priorities, critical load thresholds. The backup power agent learning environment may be, for example, that described for BPA learning environment 730.

At step 820, inputs are received or retrieved comprising current market data, current charging demand data, current system telemetry data, and current grid status & power transitions data. The receipt and retrieval may be performed by, for example, central coordinator 200.

At step 830, the market-related data is processed through an energy arbitrage agent by applying a machine learning algorithm to market-related data in conjunction with the established energy arbitrage agent learning environment to obtain energy arbitrage predictions, recommendations, or both, for optimizing the market-related factors such as charge/discharge schedules, revenue forecasts, charging costs, and battery constraints, as further described for energy arbitrage agent 400. At step 831, the EV charging-related data is processed through an EV charging agent by applying a machine learning algorithm to the EV charging data in conjunction with the established EV charging agent learning environment to obtain predictions, recommendations, or both, for charging-related factors such as recommended EV charging schedules, backup battery charging schedules, and demand forecasts, as further described for EV charging agent 500. At step 832, the battery life data is processed through a battery management service agent by applying a machine learning algorithm to the battery life data in conjunction with the established battery management service agent learning environment to obtain predictions, recommendations, or both, for battery life management such as battery degradation forecasts, operational constraints, and thermal management controls, as further described for battery management service agent 600. At step 833, the backup power data is processed through a backup power agent by applying a machine learning algorithm to the backup power data in conjunction with the established backup power agent learning environment to obtain predictions, recommendations, or both, for backup power factors such as backup power activation (also called "islanding"), critical load requirements, and backup power capacity and status, as further described for backup power agent 700.

At step 840, the predictions, recommendations, or both, for energy arbitrage, EV scheduling, battery management, and backup power are processed through a coordinator agent comprising a machine learning algorithm operating with data from a coordinator agent database to resolve conflicts, establish priorities, and send directives to a central coordinator for implementation central controller is responsible for receiving current market data, charging demand data, system telemetry data, and grid status data, and distributing the data to the agents responsible for optimizing that data, all as further described for coordinator agent 300.

Central controller receives instructions from coordinator agent and implements the instructions by operating one or more hardware components as further described for central controller 200.

Exemplary Computer System for Computer-Implemented Aspects and Embodiments

Figure 9:
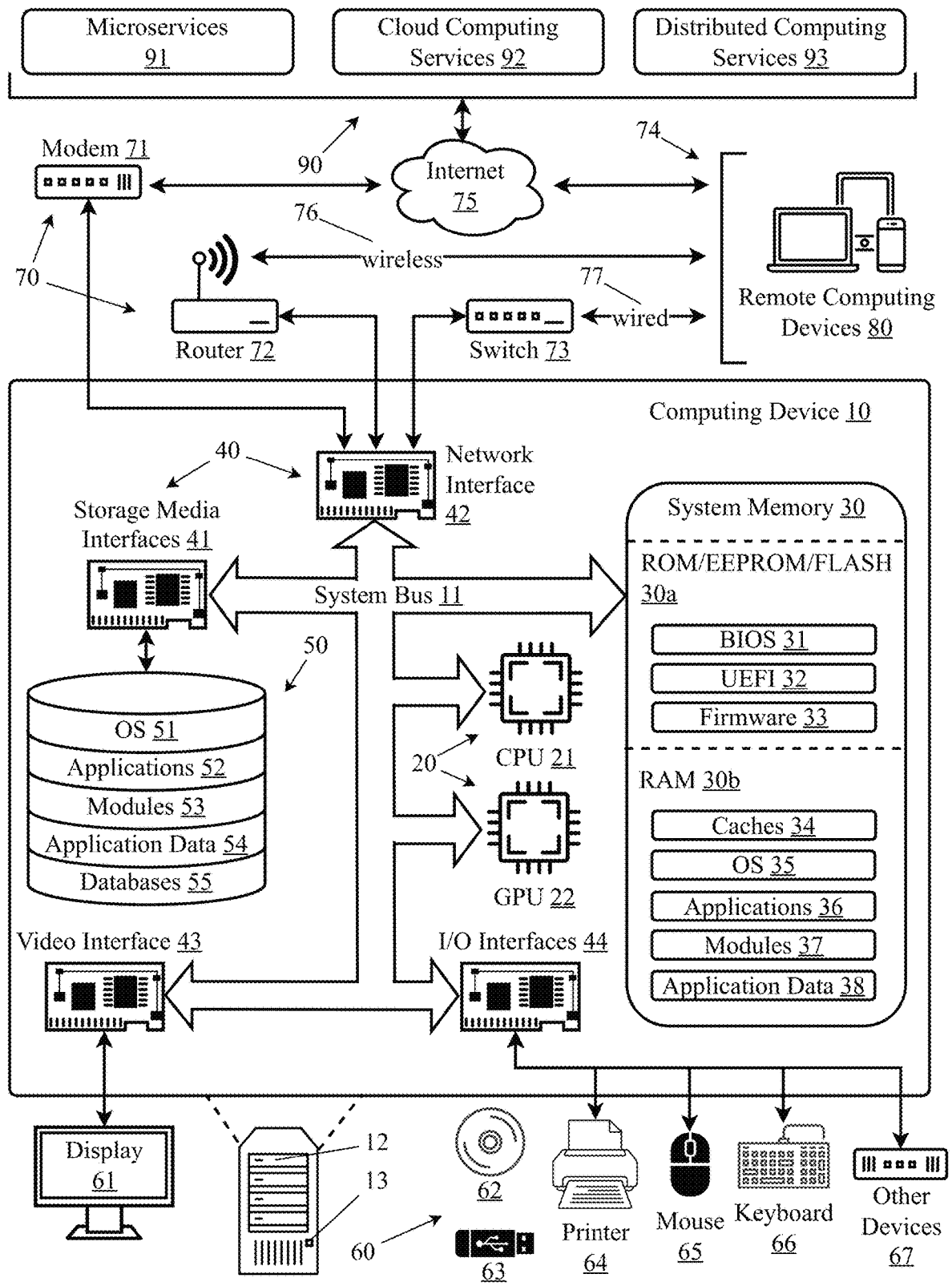
FIG. 9 illustrates an exemplary computer system on which embodiments described herein may be implemented.

FIG. 9 illustrates an exemplary computer system on which embodiments described herein may be implemented, in full or in part. This exemplary computer system describes computer-related components and processes supporting enabling disclosure of computer-implemented embodiments. Inclusion in this exemplary computer system of well-known processes and computer components, if any, is not a suggestion or admission that any aspect or embodiment is no more than an aggregation of such processes or components. Rather, implementation of an aspect or embodiment using processes and components described in this exemplary computer system will involve programming or configuration of such processes and components resulting in a machine specially programmed or configured for such implementation. The exemplary computer system described herein is only one example of such an environment and other configurations of the components and processes are possible, including other relationships between and among components, and/or absence of some processes or components described. Further, the exemplary computer system described herein is not intended to suggest any limitation as to the scope of use or functionality of any embodiment implemented, in whole or in part, on components or processes described herein.

The exemplary computer system described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computer architectures, operating systems, and environments.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computer system are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computer architectures. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for management and control of battery energy storage systems, comprising:
    a computer system comprising a memory and a processor;
    a central controller comprising a first plurality of programming instructions stored in the memory which, when operating on the processor, causes the computer system to:
        receive or retrieve data of a plurality of the following types: market-related data, EV charging data, system telemetry data, and grid status data;
        send the received or retrieved data to two or more of a plurality of other agents;
        receive one or more directives from a coordinator agent; and
        implement the directives by operating one or more hardware components;
    the coordinator agent comprising:
        a coordinator agent learning environment comprising coordinator environment data;
        a second plurality of programming instructions stored in the memory which, when operating on the processor, causes the computer system to:
            receive a prediction, or a recommendation, or both, from the two or more of the plurality of other agents;
            process the prediction, or recommendation, or both, by applying a first machine learning algorithm to the prediction, or recommendation, or both, in conjunction with the coordinator agent learning environment to generate the one or more directives for operation of hardware components; and
            forward the one or more directives to the central coordinator for implementation;
    the two or more of the plurality of other agents drawn from the following list of other agents:
        an energy arbitrage agent comprising:
            an energy arbitrage agent learning environment comprising energy arbitrage environment data;
            a third plurality of programming instructions stored in the memory which, when operating on the processor, causes the computer system to:
                receive the market-related data from the central coordinator;
                process the market-related data by applying a second machine learning algorithm to the energy arbitrage agent learning environment and the market-related data to obtain an energy arbitrage prediction or recommendation; and
                forward the energy arbitrage prediction or recommendation to the coordinator agent;
        an EV scheduling agent comprising:
            an EV scheduling agent learning environment comprising EV charging environment data;
            a fourth plurality of programming instructions stored in the memory which, when operating on the processor, causes the computer system to:
                receive the EV charging data from the central coordinator;
                process the EV charging data by applying a third machine learning algorithm to the EV charging agent learning environment and the EV charging data to obtain an EV charging prediction or recommendation; and
                forward the EV charging prediction or recommendation to the coordinator agent;
        a battery management system agent comprising:
            a battery management system agent learning environment comprising battery management system data;
            a fifth plurality of programming instructions stored in the memory which, when operating on the processor, causes the computer system to:
                receive the system telemetry data from the central coordinator;
                process the system telemetry data by applying a fourth machine learning algorithm to the battery management system agent learning environment and the system telemetry data to obtain a battery management prediction or recommendation; and
                forward the battery management prediction or recommendation to the coordinator agent; and
        a battery management system agent comprising:
            a backup power agent learning environment comprising backup power environment data;

a sixth plurality of programming instructions stored in the memory which, when operating on the processor, causes the computer system to:
receive the grid status data from the central coordinator;
process the grid status data by applying a fifth machine learning algorithm to the backup power agent learning environment and the grid status data to obtain a backup power prediction or recommendation; and
forward the backup power prediction or recommendation to the coordinator agent.

2. The system of claim 1, wherein a plurality of the machine learning algorithms are reinforcement learning type algorithms in which in which rewards are assigned to successful outcomes and/or penalties are assigned to unsuccessful outcomes.

3. The system of claim 1, wherein:
the market-related data comprises current electrical power rates;
the EV charging data comprises a demand for EV charging;
the system telemetry data comprises a battery charge status; and
the grid status data comprises an indication as to whether the grid is online.

4. The system of claim 1, wherein the coordinator environment data comprises one or more of a global system optimization objective, an operational constraint, a user satisfaction goal, a battery longevity goal, and a system resilience goal.

5. The system of claim 1, wherein the energy arbitrage environment data comprises one or more of a market price, a market pricing trend, a charge, discharge, or power demand, a grid service participation rate, and a condition of a batteries being charged or discharged.

6. The system of claim 1, wherein the EV charging environment data comprises one or more of a power allocation schedule for EVs, a charging priority, an EV charging demand, a queue length, a user requirement, and an EV battery history or condition.

7. The system of claim 1, wherein the battery management system environment data comprises one or more of a power setpoint, a temperature setpoint, a temperature, a temperature history, states of charge, a charge limit, an operational change, a maintenance history, a charge rate limitation, a predicted capacity loss, and a degradation risk metric.

8. The system of claim 1, wherein the backup power environment data comprises one or more of a grid status, a grid power transition, an available backup power indicator, a backup activation indicator, a power allocation, a mode transition priority, and a critical load threshold.

9. A method for management and control of battery energy storage systems, comprising the steps of:
a computer system comprising a memory and a processor;
using a central controller operating on a computer system comprising a memory and a processor to perform the steps of:
receiving or retrieving data of a plurality of the following types: market-related data, EV charging data, system telemetry data, and grid status data;
sending the received or retrieved data to two or more of a plurality of other agents;
receiving one or more directives from a coordinator agent operating on the computer system; and
implementing the directives by operating one or more hardware components;
using the coordinator agent comprising a coordinator agent learning environment comprising coordinator environment data to perform the steps of:
receiving a prediction, or a recommendation, or both, from the two or more of the plurality of other agents;
processing the prediction, or recommendation, or both, by applying a first machine learning algorithm to the prediction, or recommendation, or both, in conjunction with the coordinator agent learning environment to generate the one or more directives for operation of hardware components; and
forwarding the one or more directives to the central coordinator for implementation;
selecting the two or more of the plurality of other agents drawn from the following list of other agents to perform the following further steps:
using an energy arbitrage agent operating on the computer system and comprising an energy arbitrage agent learning environment comprising energy arbitrage environment data to perform the steps of:
receiving the market-related data from the central coordinator;
processing the market-related data by applying a second machine learning algorithm to the energy arbitrage agent learning environment and the market-related data to obtain an energy arbitrage prediction or recommendation; and
forwarding the energy arbitrage prediction or recommendation to the coordinator agent;
using an EV scheduling agent operating on the computing device and comprising an EV scheduling agent learning environment comprising EV charging environment data to perform the steps of:
receiving the EV charging data from the central coordinator;
processing the EV charging data by applying a third machine learning algorithm to the EV charging agent learning environment and the EV charging data to obtain an EV charging prediction or recommendation; and
forwarding the EV charging prediction or recommendation to the coordinator agent;
using a battery management system agent operating on the computer system and comprising a battery management system agent learning environment comprising battery management system data to perform the steps of:
receiving the system telemetry data from the central coordinator;
processing the system telemetry data by applying a fourth machine learning algorithm to the battery management system agent learning environment and the system telemetry data to obtain a battery management prediction or recommendation; and
forwarding the battery management prediction or recommendation to the coordinator agent; and
using a battery management system agent operating on the computer system and comprising a backup power agent learning environment comprising backup power environment data to perform the steps of:
receiving the grid status data from the central coordinator;

processing the grid status data by applying a fifth machine learning algorithm to the backup power agent learning environment and the grid status data to obtain a backup power prediction or recommendation; and forwarding the backup power prediction or recommendation to the coordinator agent.

10. The method of claim 9, wherein a plurality of the machine learning algorithms are reinforcement learning type algorithms in which in which rewards are assigned to successful outcomes and/or penalties are assigned to unsuccessful outcomes.

11. The method of claim 9, wherein:
the market-related data comprises current electrical power rates;
the EV charging data comprises a demand for EV charging;
the system telemetry data comprises a battery charge status; and
the grid status data comprises an indication as to whether the grid is online.

12. The method of claim 9, wherein the coordinator environment data comprises one or more of a global system optimization objective, an operational constraint, a user satisfaction goal, a battery longevity goal, and a system resilience goal.

13. The method of claim 9, wherein the energy arbitrage environment data comprises one or more of a market price, a market pricing trend, a charge, discharge, or power demand, a grid service participation rate, and a condition of a batteries being charged or discharged.

14. The method of claim 9, wherein the EV charging environment data comprises one or more of a power allocation schedule for EVs, a charging priority, an EV charging demand, a queue length, a user requirement, and an EV battery history or condition.

15. The method of claim 9, wherein the battery management system environment data comprises one or more of a power setpoint, a temperature setpoint, a temperature, a temperature history, states of charge, a charge limit, an operational change, a maintenance history, a charge rate limitation, a predicted capacity loss, and a degradation risk metric.

16. The method of claim 9, wherein the backup power environment data comprises one or more of a grid status, a grid power transition, an available backup power indicator, a backup activation indicator, a power allocation, a mode transition priority, and a critical load threshold.

* * * * *